United States Patent [19]

Goldberg et al.

[11] Patent Number: 4,747,158

[45] Date of Patent: May 24, 1988

[54] CORDLESS COMMUNICATIONS SYSTEM

[75] Inventors: Joshua I. Goldberg, Woodbridge; Benjamin G. Lardiere, Jr., Milford; Bruce E. McCoy, Prospect; John J. Riter, Jr., Meriden, all of Conn.

[73] Assignee: Data Products New England, Inc., Wallingford, Conn.

[21] Appl. No.: 914,080

[22] Filed: Oct. 1, 1986

Related U.S. Application Data

[60] Continuation-in-part of Ser. No. 808,606, Dec. 13, 1985, which is a division of Ser. No. 693,114, Jan. 22, 1985, Pat. No. 4,584,707.

[51] Int. Cl.$^4$ .......................... H04B 7/15; H04B 5/00
[52] U.S. Cl. ........................................ 455/11; 455/41; 455/54; 379/55
[58] Field of Search ........................ 455/14, 41, 54, 55, 455/56, 21, 22, 11, 13, 15, 90; 381/79; 379/55; 178/43

[56] References Cited

U.S. PATENT DOCUMENTS

| | | | |
|---|---|---|---|
| 2,419,833 | 4/1947 | Grimes | 455/41 |
| 2,510,066 | 6/1950 | Busignies | 379/55 |
| 2,980,793 | 4/1961 | Daniel | 379/55 |
| 3,803,366 | 4/1974 | Ishii et al. | 455/55 |
| 3,979,674 | 9/1976 | Martin | 455/14 |
| 4,117,271 | 9/1978 | Teeter et al. | 379/55 |
| 4,136,338 | 1/1979 | Antenore | 379/55 |
| 4,471,491 | 9/1984 | Abe et al. | 455/22 |
| 4,584,707 | 4/1986 | Goldberg et al. | 455/54 |

Primary Examiner—Robert L. Griffin
Assistant Examiner—Curtis Kuntz
Attorney, Agent, or Firm—Bachman & LaPointe

[57] ABSTRACT

A cordless communications system wherein transmission is made and received via magnetic lines of induction comprises a base station and at least one mobile station wherein the base station receives and transmits voice or data signals at different frequencies. A PIGLER unit is selectively disposed between the base station and mobile station so as to extend the range of the communications system.

4 Claims, 2 Drawing Sheets

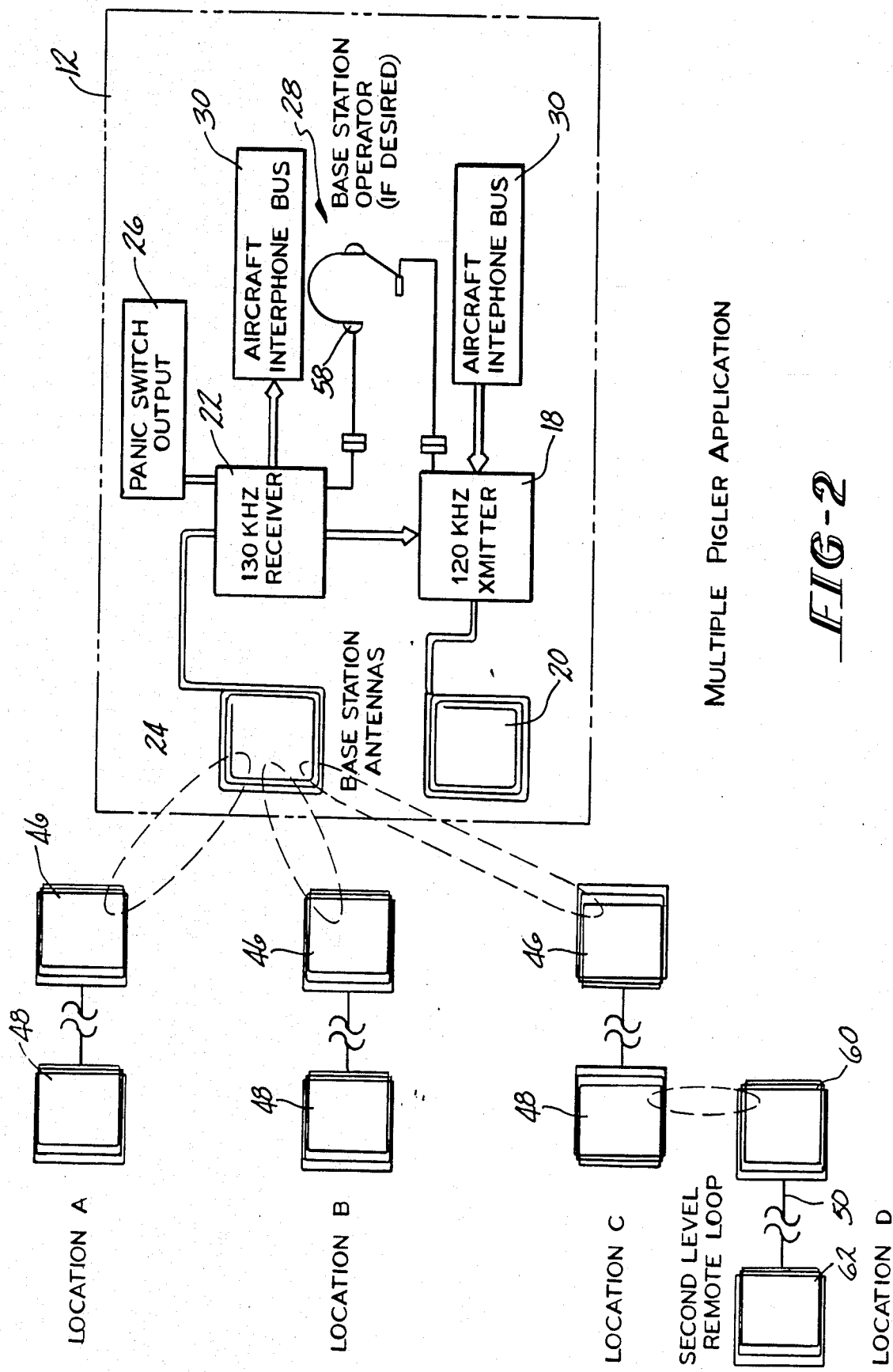

CORDLESS COMMUNICATIONS SYSTEM

CROSS REFERENCE TO RELATED APPLICATIONS

This application is a continuation-in-part of application Ser. No. 808,606, filed Dec. 13, 1985 which in turn is a Divisional of application Ser. No. 693,114, filed Jan. 22, 1985, now U.S Pat. No. 4,584,707.

BACKGROUND OF THE INVENTION

The present invention relates to a cordless communications system and, more particularly, to a cordless communications system wherein transmission is made between crew stations and a base station via magnetic lines of induction.

Conventional communications systems which employ generally known radio frequency techniques are not particularly suitable for military use where a high degree of security is desired. For example, with conventional HF and VHF walkie-talkies interference with existing radio, radar, navigation and ECM equipment is likely to occur. In addition, as an electrical field loses strength as the square of the distance from the transmitter, it is possible for communications to be intercepted. Furthermore, walkie-talkie systems presently employed experience numerous "blind spots" which result from (1) the inability of the electrical field to penetrate conductive materials and/or (2) re-radiation from conductive materials creating destructive interference. Finally, conventional radio frequency components used in known walkie-talkies are generally expensive and prone to failure.

Naturally, it would be highly desirable to provide a communications system which is intrinsically difficult to jam, eliminates interference with existing electronic equipment and has a high degree of security. Additionally, the communications system should be relatively compact, inexpensive and, in the case of crew stations, comfortable for the user.

Accordingly, it is the principal object of the present invention to provide a cordless communications system wherein transmission is made and received via magnetic lines of induction so as to provide an inherent high degree of security and elminates virtually all blind spots.

It is a further object of the present invention to provide a cordless communications system which is virtually impossible to jam.

It is a particular object of the present invention to provide a cordless communications system including a PIGLER unit to extend the range of the system.

Further objects and advantages will appear hereinbelow.

SUMMARY OF THE INVENTION

In accordance with the present invention the foregoing objects and advantages are readily obtained.

The present invention relates to a cordless communications system and, more particularly, to a cordless communications system wherein transmission is made and received via magnetic lines of induction. The communications system of the present invention comprises a base station and at least one mobile station. The base station has at least two magnetic loop antennas for transmitting and receiving first and second voice or data signals, respectively at different frequencies. In a preferred embodiment of the present invention, the magnetic loop antennas are oriented so as to provide a torodial magnetic field which allows for 360° transmission and reception of magnetic signals in the planes of the antennas. The mobile station is provided with a magnetic loop antenna which is coupled to an antenna switch for transmitting and receiving the voice or data signals. The antenna switch is normally in its receiving mode and is actuated to transmitting mode by a push to talk switch or button. The mobile station is battery powered. A passive inductive ground line electric repeater (PIGLER) unit is disposed between the base station and the mobile station. The PIGLER unit is provided with a first PIGLER loop antenna proximate to the base station and a second PIGLER loop antenna proximate to the mobile station. The first PIGLER loop antenna receives the transmitted signal from the base station and retransmits it to the second PIGLER loop antenna which in turn is received by the mobile station. The second PIGLER loop antenna receives signal from the mobile station and retransmits to the first PIGLER loop antenna which is then received by the base station. By way of the present invention the range of the communication system is enhanced.

The communications system of the present invention offers significant advantages over those devices heretofore known. First of all, by using magnetic lines of induction to couple the mobile station or stations via PIGLERS to the base station, a number of unique features are obtained. The ability of the magnetic lines of force to follow ferromagnetic materials and emerge undistorted enhances the systems ability to convey informational signals. Additionally, the ability of the magnetic lines of flux to follow around conductive non-magnetic materials eliminates virtually all blind spots which are experienced with conventional HF and VHF walkie-talkies. The ability to follow non-magnetic materials, such as aluminum, is particularly useful in airplanes where crew communication is desired. In addition, as a result of the rapid decrease in signal strength, remote jamming of communications is virtually impossible as any antenna which would be capable of generating field strengths of sufficient magnitude to prevent communications would be absurdly large. Finally, the use of coils as magnetic dipoles enhance their resistance to outside electromagnetic interference because the spatial orientations of the B and E fields in the propagating wave generated by magnetic dipoles are reversed relative to those broadcast by conventional electronic dipoles.

Further advantages of the present invention will appear hereinafter.

BRIEF DESCRIPTION OF THE DRAWINGS

FIG. 2 is a partial schematic block diagram illustrating a multiple PIGLER application in accordance with the present invention.

DETAILED DESCRIPTION

Figure 1:
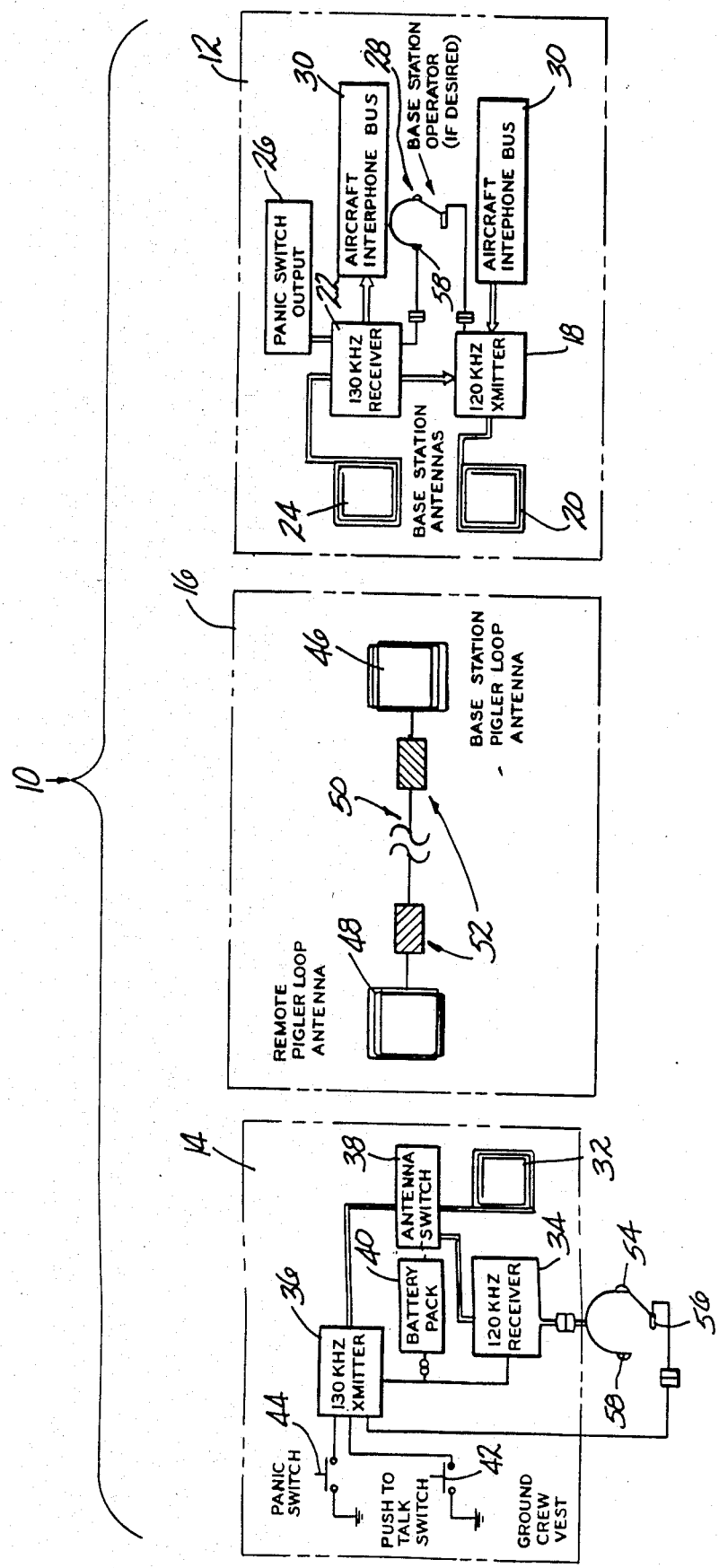
FIG. 1 is a schematic block diagram illustrating the cordless communications system of the present invention employing a single PIGLER unit.

With reference to FIG. 1, the cordless communications system of the present invention will be described in detail.

The communications system 10 comprises a base station 12, at least one mobile station 14 and a PIGLER unit 16 (PIGLER being an abbreviation for passive inductive ground line electric repeater). In an aerospace environment, for example, the base station 12 might be located at the navigator's station in the airplane and the mobile stations 14 would typically be roving crew members.

The base station 12 consists of a transmitter 18 coupled to a first magnetic loop antenna 20 for transmitting a first modulated voice or data signal to PIGLER unit 16 at a first operating frequency, for example, 120 KHZ. The base station 12 further includes a receiver 22 which is coupled to a second magnetic loop antenna 24 for receiving a second modulated voice or data signal from the PIGLER unit 16 at a second frequency different from the first frequency, for example, 130 KHZ. The receiver 22 has a panic switch output 26 and is also coupled to transmitter 18 for reasons to be explained hereinbelow. As shown in FIG. 1, the base station 12 may be operated by a base station operator 28 and/or be used to connect an intercom or other radio system 30 thereto.

In accordance with a particular feature of the present invention, the magnetic loop antennas are oriented so as to provide a torodial magnetic field which allows for 360° transmission and reception of magnetic signals in the plane of the antennas. Alternatively, the base station 12 may be provided with additional transmit and receive antennas, not shown, the placement of which conserve to increase the range of the system, modify the allowed field of operation or both.

Mobile station 14 comprises an antenna 32 which is selectively coupled to either a receiver 34 or transmitter 36 by way of an antenna switch 38. In accordance with the present invention, mobile receiver 34 and transmitter 36 operate at the same operating frequencies as base station transmitter 18 and receiver 22, respectively, that is, for example, 120 KHZ and 130 KHZ. The mobile station 14 is powered by means of a battery pack 40. Antenna switch 38 is moved from its first operative position where it couples antenna 32 with receiver 34 to its second operative position where it couples antenna 32 with transmitter 36 by means of push to talk switch 42. Mobile station 14 includes a panic switch 44 for transmitting an amplitude modulated signal to the base station. This signal is detected by the base station receiver prior to any limiting stages to ensure detection of the panic switch signal even in the presence of other transmitted signals. When this panic switch signal is detected, the base station transmits a raucous tone to all mobile stations and outputs a discrete signal 26 available at the base station.

PIGLER unit 16 comprises a first loop antenna 46 proximate to base station 12 and a second loop antenna 48 proximate to mobile station 14. Antennas 46 and 48 are connected via a ground wire 50. The antennas have linear impedance matching filters 52 at each end which act to optimize the ability of each antenna 46 and 48 to induce current in the ground wire 50 and to optimize the ability of currents in the ground wire 50 to maximize the creation of flux around the PIGLER unit. The effect of this optimization is to maximize the remote area in which practical communications can take place. The ground line or wire used to connect antennas 46 and 48 is typically shielded and the shield is grounded at one end if this is convenient. More importantly the wires are twisted to minimize loop area and so minimize extraneous noise induced in the wire run. Of the two described techniques to minimize induced ground noise, twisting is usually the more important.

The operation of the communications system of the present invention is as follows. Pressing the push to talk switch 42 of mobile unit 14 places the system in its transmit mode by coupling transmitter 36 to antenna 32. The operator 54 then speaks into microphone 56. The transmitter 36 operates using a frequency modulation of a crystal controlled carrier as is known in the art. Antenna 48 intercepts the magnetic field created from transmitter 36 and induces a current which is carried by ground wire 50 to base PIGLER antenna 46 thereby inducing a current in antenna 46 which creates a flux which is picked up by base station receiver antenna 24. When the push to talk switch 42 is released, antenna switch 38 couples antenna 32 to receiver 34 so as to place mobile station 14 in its receive mode where information being transmitted from the base station 12 via PIGLER unit 16 is received, demodulated and heard by the operator 54 in the head set 58. The mobile station 14 transmits to base station 12. When a plurality of mobile stations 14 are employed all stations 14 transmit only to base station 12 and not to each other and likewise receive transmissions only from base station 12.

Base station 12 is set up to both transmit to and receive from mobile station 14 via PIGLER unit 16 at the same time. When the base station 12 receives a signal from antenna 46 which is generated from a mobile station 14 in receiver 22, the information is demodulated and then used to modulate the base station transmitter 18 thus passing the information along to the other mobile stations 14 if any. Thus, the base station 12 operates unattended and transparently to the mobile station 14 in the system. Additionally, the base station 12 can be used to connect to an intercom 30 as well as allow usage by an operator 24 located at the base station 12. The antenna 46 is designed to intercept lines of magnetic flux from the transmit antenna 20. In this way, whatever is transmitted from the base station 12 induces a current in the PIGLER loop antenna 46. The induced current is carried from antenna 46 via ground wire 50 to antenna 48 wherein a flux is created which is picked up by antenna 32.

Multiple PIGLER units 16 can be used with a single base station 12 as is illustrated in FIG. 2. The isolated areas so covered can partially overlap or they may be distant. This property can be particularly useful when areas are electrically isolated. Thus inside an aircraft fuselage, outside that same aircraft (on the ground) and some point a thousand yards away can all be part of the same wireless intercommunication system using PIGLER units. It is also possible to concatenate PIGLER coils. That is one can locate a PIGLER unit at the remote end of an existing PIGLER unit. As shown in FIG. 2, antenna 60 can be located proximate to antenna 48. Magnetic flux intercepted by antenna 60 will induce a current therein which is transferred to antenna 62. The second generation PIGLER unit will not have nearly the useful communications area of the first generation PIGLER unit but bidirectional communications will still occur.

As noted above, the cordless communications system of the present invention offers significant improvements over systems heretofore known. The invention allows a base station to provide multiple isolated areas of communication by adding only crew sets in these isolated areas. These isolated areas can be physically separate or electrically isolated.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A cordless communications system wherein transmission is made and received via magnetic lines of induction comprising:

a base station, at least one mobile station and at least one PIGLER unit disposed between said base station and said at least one mobile station;

said base station having a first base magnetic loop antenna and a second base magnetic loop antenna for transmission and reception of magnetic signals, base transmitting means coupled to said first base magnetic loop antenna for transmitting a first signal to said PIGLER unit, base receiving means coupled to said second base magnetic loop antenna for receiving a second signal from said PIGLER unit;

said at least one mobile station having a mobile magnetic loop antenna coupled to an antenna switch having first and second operating positions, mobile receiving means coupled to said mobile magnetic loop antenna when said antenna switch is in said first position for receiving said first signal from said PIGLER unit, mobile transmitting means coupled to said mobile magnetic loop antenna when said antenna switch is in said second position for transmitting said second signal to said PIGLER unit; and said at least one PIGLER unit having a first PIGLER loop antenna proximate to said base station and a second PIGLER loop antenna proximate to said at least one mobile station and means for coupling said first PIGLER loop antenna to said second PIGLER loop antenna wherein said first PIGLER loop antenna receives said first signal from said base transmitting means and retransmits said first signal to said second PIGLER loop antenna and wherein said second PIGLER loop antenna receives said second signal from said mobile transmitting means and retransmits said second signal to said first PIGLER loop antenna.

2. A cordless communications system according to claim 1 wherein said first PIGLER loop antenna and said second PIGLER loop antenna are coupled via a ground wire.

3. A cordless communications system according to claim 1 wherein said first PIGLER loop antenna and said second PIGLER loop antenna each have linear impedance matching filters.

4. A cordless communications system according to claim 2 wherein said first PIGLER loop antenna and said second PIGLER loop antenna each have linear impedance matching filters.

* * * * *